United States Patent
Takahashi et al.

(10) Patent No.: US 12,518,618 B2
(45) Date of Patent: Jan. 6, 2026

(54) CONTROL DEVICE AND CONTROL METHOD

(71) Applicant: SONY GROUP CORPORATION, Tokyo (JP)

(72) Inventors: Yuji Takahashi, Tokyo (JP); Ryoji Kadota, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 63 days.

(21) Appl. No.: 18/560,735

(22) PCT Filed: Jan. 31, 2022

(86) PCT No.: PCT/JP2022/003497
§ 371 (c)(1),
(2) Date: Nov. 14, 2023

(87) PCT Pub. No.: WO2022/249545
PCT Pub. Date: Dec. 1, 2022

(65) Prior Publication Data
US 2024/0257633 A1 Aug. 1, 2024

(30) Foreign Application Priority Data
May 28, 2021 (JP) .................................. 2021-090151

(51) Int. Cl.
*G08C 17/00* (2006.01)
*H02J 7/00* (2006.01)

(52) U.S. Cl.
CPC ............ *G08C 17/00* (2013.01); *H02J 7/0047* (2013.01); *H04Q 2209/00* (2013.01); *H04Q 2209/88* (2013.01); *H04Q 2209/886* (2013.01)

(58) Field of Classification Search
CPC ........... H04Q 2209/00; H04Q 2209/10; H04Q 2209/20; H04Q 2209/40; H04Q 2209/43;
(Continued)

(56) References Cited

U.S. PATENT DOCUMENTS 10,368,146 B2 * 7/2019 Potyrailo ............... H04Q 9/00

FOREIGN PATENT DOCUMENTS

EP          2025288 A1 *  2/2009  ............... A61B 6/00
JP     2017-009305 A      1/2017
(Continued)

OTHER PUBLICATIONS

International Search Report and Written Opinion of PCT Application No. PCT/JP2022/003497, issued on Apr. 12, 2022, 08 pages of ISRWO.

*Primary Examiner* — Franklin D Balseca
(74) *Attorney, Agent, or Firm* — CHIP LAW GROUP

(57) ABSTRACT

Provided is a control device configured to control that controls a plurality of operations that consumes environmentally generated power in at least one control mode of a plurality of control modes. The plurality of operations includes an operation A including writing of data (DAT) from a sensor, an operation B including recognition of the data (DAT) written by the operation A, and an operation C including transmission of the data (DATrecog) after the recognition by the operation B. The plurality of control modes includes a first control mode of controlling the plurality of operations so as to perform, in preference to the operation A for the data (DAT) from the sensor, at least one of the operation B and the operation C for the previously processed data (DAT) from the sensor, and a second control mode of controlling the plurality of operations so as to perform the operation A for the data (DAT) from the sensor in preference to the operation B and the operation C for the previously processed data (DAT) from the sensor.

10 Claims, 13 Drawing Sheets

(58) Field of Classification Search
CPC ........... H04Q 2209/47; H04Q 2209/80; H04Q 2209/82; H04Q 2209/823; H04Q 2209/826; H04Q 2209/88; H04Q 2209/886; H04Q 9/00; H02J 7/0047; G08C 17/00
See application file for complete search history.

(56) References Cited

FOREIGN PATENT DOCUMENTS

| | | | |
|---|---|---|---|
| JP | 2019-046157 A | 3/2019 | |
| JP | 2020-174330 A | 10/2020 | |
| WO | WO-2012148395 A1 * | 11/2012 | ............... H04Q 9/00 |
| WO | 2015/115654 A1 | 8/2015 | |

* cited by examiner

FIG. 2

| TIME | t1 | t2 | t3 | t4 | t5 | t6 | t7 | t8 | t9 | t10 |
|---|---|---|---|---|---|---|---|---|---|---|
| ADDITIONAL POWER AMOUNT | 10.0 | 10.0 | 10.0 | 10.0 | 10.0 | 10.0 | 10.0 | 10.0 | 10.0 | 10.0 |
| BATTERY RESIDUAL AMOUNT (BEFORE OPERATION) | 10.0 | 19.0 | 27.0 | 34.0 | 41.0 | 49.0 | 56.0 | 65.0 | 74.0 | 84.0 |
| OPERATION A | DAT1 | DAT2 | DAT3 | DAT4 | DAT5 | DAT6 | - | - | - | - |
| OPERATION B | - | DAT1 ⇨ DATrecog1 | DAT2 ⇨ DATrecog2 | DAT3 ⇨ DESTROY | DAT4 ⇨ DATrecog4 | DAT5 ⇨ DESTROY | DAT6 ⇨ DATrecog6 | - | - | - |
| OPERATION C | - | - | DATrecog1 | DATrecog2 | - | DATrecog4 | - | DATrecog6 | - | - |
| BATTERY RESIDUAL AMOUNT (AFTER OPERATION) | 9.0 | 17.0 | 24.0 | 31.0 | 39.0 | 46.0 | 55.0 | 64.0 | 74.0 | 84.0 |

FIG.3

| TIME | t11 | t12 | t13 | t14 | t15 | t16 | t17 | t18 | t19 | t20 |
|---|---|---|---|---|---|---|---|---|---|---|
| ADDITIONAL POWER AMOUNT | 2.0 | 2.0 | 2.0 | 2.0 | 2.0 | 2.0 | 2.0 | 2.0 | 2.0 | 2.0 |
| BATTERY RESIDUAL AMOUNT (BEFORE OPERATION) | 2.0 | 3.0 | 3.0 | 2.0 | 2.0 | 2.0 | 2.0 | 2.0 | 3.0 | 4.0 |
| OPERATION A | DAT1 | DAT2 | DAT3 | DAT4 | DAT5 | DAT6 | - | - | - | - |
| OPERATION B | - | DAT1 ⇨ DATrecog1 | DAT2 ⇨ DATrecog2 | - | DAT3 ⇨ DESTROY | DAT4 ⇨ DATrecog4 | DAT5 ⇨ DESTROY | DAT6 ⇨ DATrecog6 | - | - |
| OPERATION C | - | - | DATrecog1 | DATrecog2 | - | - | DATrecog4 | - | DATrecog6 | - |
| BATTERY RESIDUAL AMOUNT (AFTER OPERATION) | 1.0 | 1.0 | 0.0 | 0.0 | 0.0 | 0.0 | 0.0 | 1.0 | 2.0 | 4.0 |

FIG.4

| TIME | t11E | t12E | t13E | t14E | t15E | t16E | t17E | t18E | t19E | t20E |
|---|---|---|---|---|---|---|---|---|---|---|
| ADDITIONAL POWER AMOUNT | 2.0 | 2.0 | 2.0 | 2.0 | 2.0 | 2.0 | 2.0 | 2.0 | 2.0 | 2.0 |
| BATTERY RESIDUAL AMOUNT (BEFORE OPERATION) | 2.0 | 3.0 | 3.0 | 2.0 | 2.0 | 3.0 | 3.0 | 2.0 | 3.0 | 4.0 |
| OPERATION A | DAT1 | DAT2 | DAT3 | - | DAT4 | DAT5 | DAT6 | - | - | - |
| OPERATION B | - | DAT1 ⇨ DATrecog1 | DAT2 ⇨ DATrecog2 | DAT3 ⇨ DESTROY | - | DAT4 ⇨ DATrecog4 | DAT5 ⇨ DESTROY | DAT6 ⇨ DATrecog6 | - | - |
| OPERATION C | - | - | DATrecog1 | DATrecog2 | - | - | DATrecog4 | - | DATrecog6 | - |
| BATTERY RESIDUAL AMOUNT (AFTER OPERATION) | 1.0 | 1.0 | 0.0 | 0.0 | 1.0 | 1.0 | 0.0 | 1.0 | 2.0 | 4.0 |

FIG.5

| TIME | t21 | t22 | t23 | t24 | t25 | t26 | t27 | t28 | t29 | t30 |
|---|---|---|---|---|---|---|---|---|---|---|
| ADDITIONAL POWER AMOUNT | 1.5 | 1.5 | 1.5 | 1.5 | 1.5 | 1.5 | 1.5 | 1.5 | 1.5 | 1.5 |
| BATTERY RESIDUAL AMOUNT (BEFORE OPERATION) | 1.5 | 2.0 | 2.5 | 2.0 | 1.5 | 2.0 | 1.5 | 2.0 | 2.5 | 3.0 |
| OPERATION A | DAT1 | DAT2 | DAT3 | DAT4 | DAT5 | DAT6 | - | - | - | - |
| OPERATION B | - | - | DAT1&DAT2 ⇨ DATrecog12 | - | - | DAT3&DAT4 ⇨ DATrecog34 | - | DAT5&DAT6 ⇨ DATrecog56 | - | - |
| OPERATION C | - | - | - | DATrecog12 | - | - | DATrecog34 | - | DATrecog56 | - |
| BATTERY RESIDUAL AMOUNT (AFTER OPERATION) | 0.5 | 1.0 | 0.5 | 0.0 | 0.5 | 0.0 | 0.5 | 1.0 | 1.5 | 3.0 |

FIG.6

| TIME | t31 | t32 | t33 | t34 | t35 | t36 | t37 | t38 | t39 | t40 |
|---|---|---|---|---|---|---|---|---|---|---|
| ADDITIONAL POWER AMOUNT | 1.5 | 1.5 | 1.5 | 1.5 | 1.5 | 1.5 | 1.5 | 1.5 | 1.5 | 1.5 |
| BATTERY RESIDUAL AMOUNT (BEFORE OPERATION) | 1.5 | 2.0 | 1.5 | 2.0 | 1.5 | 2.0 | 1.5 | 2.0 | 2.5 | 3.0 |
| OPERATION A | DAT1 | DAT2 | DAT3 | DAT4 | DAT5 | DAT6 | - | - | - | - |
| OPERATION B | - | DAT1 ⇨ DATrecog1 | - | - | - | DAT2, DAT3, DAT4, &DAT5 ⇨ DATrecog2345 | - | DAT6 ⇨ DATrecog6 | - | - |
| OPERATION C | - | - | - | DATrecog1 | - | - | DATrecog2345 | - | DATrecog6 | - |
| BATTERY RESIDUAL AMOUNT (AFTER OPERATION) | 0.5 | 0.0 | 0.5 | 0.0 | 0.5 | 0.0 | 0.5 | 1.0 | 1.5 | 3.0 |

FIG.7

| TIME | t41 | t42 | t43 | t44 | t45 | t46 | t47 | t48 | t49 | t50 |
|---|---|---|---|---|---|---|---|---|---|---|
| ADDITIONAL POWER AMOUNT | 1.0 | 1.0 | 1.0 | 1.0 | 1.0 | 1.0 | 1.0 | 1.0 | 1.0 | 1.0 |
| BATTERY RESIDUAL AMOUNT (BEFORE OPERATION) | 1.0 | 1.0 | 1.0 | 1.0 | 1.0 | 1.0 | 1.0 | 1.0 | 1.0 | 1.0 |
| OPERATION A | DAT1 | DAT2 | DAT3 | DAT4 | DAT5 | DAT6 | - | - | - | - |
| OPERATION B | - | - | - | - | - | - | DAT1, DAT2, &DAT3 ⇨ DATrecog123 | - | DAT4, DAT5, &DAT6 ⇨ DATrecog456 | - |
| OPERATION C | - | - | - | - | - | - | - | DATrecog123 | - | DATrecog456 |
| BATTERY RESIDUAL AMOUNT (AFTER OPERATION) | 0.0 | 0.0 | 0.0 | 0.0 | 0.0 | 0.0 | 0.0 | 0.0 | 0.0 | 0.0 |

FIG.8

| TIME | t51 | t52 | t53 | t54 | t55 | t56 | t57 | t58 | t59 | t60 |
|---|---|---|---|---|---|---|---|---|---|---|
| ADDITIONAL POWER AMOUNT | 1.0 | 1.0 | 1.0 | 1.0 | 1.0 | 1.0 | 1.0 | 1.0 | 1.0 | 1.0 |
| BATTERY RESIDUAL AMOUNT (BEFORE OPERATION) | 1.0 | 1.0 | 1.0 | 1.0 | 1.0 | 1.0 | 1.0 | 1.0 | 1.0 | 2.0 |
| OPERATION A | DAT1 | DAT2 | DAT3 | DAT4 | DAT5 | DAT6 | - | - | - | - |
| OPERATION B | - | - | - | - | - | - | DAT1, DAT2, DAT3, DAT4, DAT5, &DAT6 ⇨ DATrecog123456 | - | - | - |
| OPERATION C | - | - | - | - | - | - | - | DATrecog123456 | - | - |
| BATTERY RESIDUAL AMOUNT (AFTER OPERATION) | 0.0 | 0.0 | 0.0 | 0.0 | 0.0 | 0.0 | 0.0 | 0.0 | 1.0 | 2.0 |

FIG.9

| TIME | t61 | t62 | t63 | t64 | t65 | t66 | t67 | t68 | t69 | t70 |
|---|---|---|---|---|---|---|---|---|---|---|
| ADDITIONAL POWER AMOUNT | 1.0 | 1.0 | 1.0 | 1.0 | 1.0 | 1.0 | 1.0 | 1.0 | 1.0 | 1.0 |
| BATTERY RESIDUAL AMOUNT (BEFORE OPERATION) | 1.0 | 1.0 | 1.0 | 1.0 | 1.0 | 1.0 | 1.0 | 1.0 | 1.0 | 1.0 |
| MEMORY RESIDUAL AMOUNT (BEFORE OPERATION) | 4R | 3R | 2R | 1R | 3R | 2R | 1R | 0R | 1R | 3R |
| OPERATION A | DAT1 | DAT2 | DAT3 | - | DAT4 | DAT5 | DAT6 | - | - | - |
| OPERATION B | - | - | - | DAT1, DAT2, &DAT3 ⇨ DATrecog123 | - | - | - | - | DAT4, DAT5, &DAT6 ⇨ DATrecog456 | - |
| OPERATION C | - | - | - | - | - | - | - | DATrecog123 | - | DATrecog456 |
| BATTERY RESIDUAL AMOUNT (AFTER OPERATION) | 0.0 | 0.0 | 0.0 | 0.0 | 0.0 | 0.0 | 0.0 | 0.0 | 0.0 | 0.0 |

FIG.10

| TIME | t71 | t72 | t73 | t74 | t75 | t76 | t77 | t78 | t79 | t80 |
|---|---|---|---|---|---|---|---|---|---|---|
| ADDITIONAL POWER AMOUNT | 0.8 | 0.8 | 0.8 | 0.8 | 0.8 | 0.8 | 0.8 | 0.8 | 0.8 | 0.8 |
| BATTERY RESIDUAL AMOUNT (BEFORE OPERATION) | 0.8 | 1.6 | 1.4 | 1.2 | 1.0 | 0.8 | 1.6 | 1.4 | 1.2 | 1.0 |
| OPERATION A | - | DAT1 | DAT2 | DAT3 | DAT4 | - | DAT5 | DAT6 | - | - |
| OPERATION B | - | - | - | - | - | - | - | - | DAT1, DAT2, DAT3, DAT4, DAT5, &DAT6 ⇨ DATrecog123456 | - |
| OPERATION C | - | - | - | - | - | - | - | - | - | DATrecog123456 |
| BATTERY RESIDUAL AMOUNT (AFTER OPERATION) | 0.8 | 0.6 | 0.4 | 0.2 | 0.0 | 0.8 | 0.6 | 0.4 | 0.2 | 0.0 |

FIG. 11

| TIME | t81 | t82 | t83 | t84 | t85 | t86 | t87 | t88 | t89 | t90 |
|---|---|---|---|---|---|---|---|---|---|---|
| ADDITIONAL POWER AMOUNT | 1.0 | 1.5 | 1.5 | 2.0 | 2.0 | 3.0 | 3.0 | 4.0 | 4.0 | 5.0 |
| BATTERY RESIDUAL AMOUNT (BEFORE OPERATION) | 1.0 | 1.5 | 2.0 | 2.0 | 2.0 | 3.0 | 3.0 | 6.0 | 9.0 | 14.0 |
| OPERATION A | DAT1 | DAT2 | DAT3 | DAT4 | DAT5 | DAT6 | - | - | - | - |
| OPERATION B | - | - | DAT1&DAT2 ⇨ DATrecog12 | - | DAT3&DAT4 ⇨ DATrecog34 | DAT5 ⇨ DESTROY | DAT6 ⇨ DATrecog6 | - | - | - |
| OPERATION C | - | - | - | DATrecog12 | - | DATrecog34 | - | DATrecog6 | - | - |
| BATTERY RESIDUAL AMOUNT (AFTER OPERATION) | 0.0 | 0.5 | 0.0 | 0.0 | 0.0 | 0.0 | 2.0 | 5.0 | 9.0 | 14.0 |

CONTROL DEVICE AND CONTROL METHOD

CROSS REFERENCE TO RELATED APPLICATIONS

This application is a U.S. National Phase of International Patent Application No. PCT/JP2022/003497 filed on Jan. 31, 2022, which claims priority benefit of Japanese Patent Application No. JP 2021-090151 filed in the Japan Patent Office on May 28, 2021. Each of the above-referenced applications is hereby incorporated herein by reference in its entirety.

FIELD

The present disclosure relates to a control device, a control method, and a control program.

BACKGROUND

For example, Patent Literature 1 discloses a technique for transmitting data from a sensor using power generated by ambient light.

CITATION LIST

Patent Literature

Patent Literature 1: JP 2019-46157 A

SUMMARY

Technical Problem

Examples of an operation up to data transmission include an operation of writing data from a sensor, an operation of recognizing the written data, and an operation of transmitting the recognized data. There is a case in which all these operations cannot be performed due to shortage of generated power or the like. When a write operation of data is delayed, there is still room for consideration in operation control such as occurrence of a data loss.

One aspect of the present disclosure enables suppression of a data loss.

Solution to Problem

A control device according to one aspect of the present disclosure is a control device configured to control a plurality of operations that consumes environmentally generated power in at least one control mode of a plurality of control modes, wherein the plurality of operations includes: an operation A including writing of data from a sensor; an operation B including recognition of the data written by the operation A; and an operation C including transmission of the data after the recognition by the operation B, and wherein the plurality of control modes includes: a first control mode of controlling the plurality of operations so as to perform, in preference to the operation A for the data from the sensor, at least one of the operation B and the operation C for the previously processed data from the sensor; and a second control mode of controlling the plurality of operations so as to perform the operation A for the data from the sensor in preference to the operation B and the operation C for the previously processed data from the sensor.

A control method according to one aspect of the present disclosure is a method of controlling a plurality of operations that consumes environmentally generated power in at least one control mode of a plurality of control modes, wherein the plurality of operations includes: an operation A including writing of data from a sensor; an operation B including recognition of the data written by the operation A; and an operation C including transmission of the data after the recognition by the operation B, and wherein the plurality of control modes includes: a first control mode of controlling the plurality of operations so as to perform, in preference to the operation A for the data from the sensor, at least one of the operation B and the operation C for the previously processed data from the sensor; and a second control mode of controlling the plurality of operations so as to perform the operation A for the data from the sensor in preference to the operation B and the operation C for the previously processed data from the sensor.

A control program according to one aspect of the present disclosure is a control program configured to cause a computer to control a plurality of operations that consumes environmentally generated power in at least one control mode of a plurality of control modes, wherein the plurality of operations includes: an operation A including writing of data from a sensor; an operation B including recognition of the data written by the operation A; and an operation C including transmission of the data after the recognition by the operation B, and wherein the plurality of control modes includes: a first control mode of controlling the plurality of operations so as to perform, in preference to the operation A for the data from the sensor, at least one of the operation B and the operation C for the previously processed data from the sensor; and a second control mode of controlling the plurality of operations so as to perform the operation A for the data from the sensor in preference to the operation B and the operation C for the previously processed data from the sensor.

BRIEF DESCRIPTION OF DRAWINGS

FIG. 2 is a diagram illustrating an example of control including control in a first control mode.

FIG. 3 is a diagram illustrating an example of control including control in a second control mode.

FIG. 4 is a diagram illustrating a comparative example.

FIG. 5 is a diagram illustrating an example of control including control in a third control mode.

FIG. 6 is a diagram illustrating an example of control including control in the third control mode.

FIG. 7 is a diagram illustrating an example of control including control in the third control mode.

FIG. 8 is a diagram illustrating an example of control including control in the third control mode.

FIG. 9 is a diagram illustrating an example of control including control in a fourth control mode.

FIG. 10 is a diagram illustrating an example of control including control in a fifth control mode.

FIG. 11 is a diagram illustrating an example of control in a case where an additional power amount fluctuates.

DESCRIPTION OF EMBODIMENTS

Figure 1:
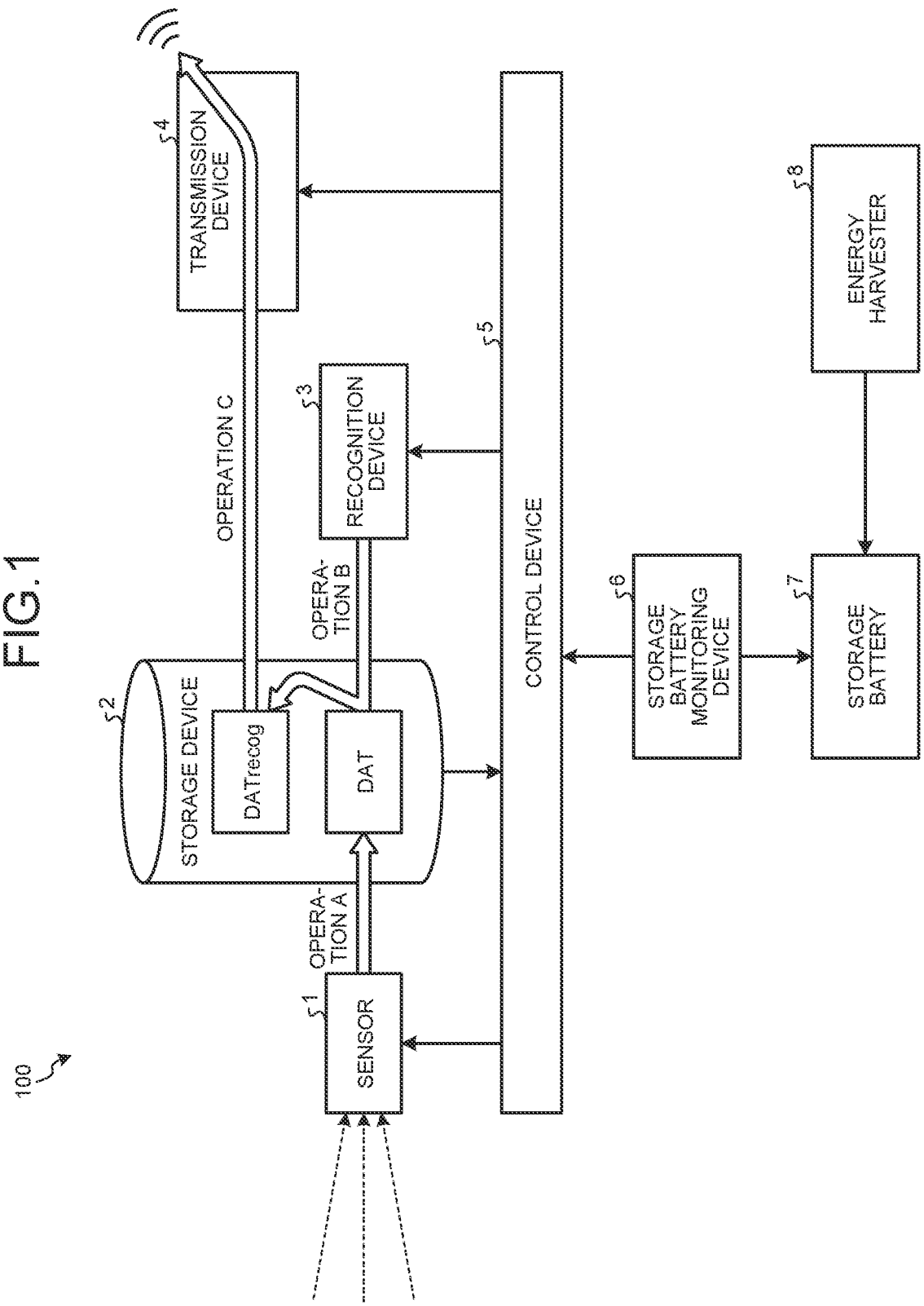
FIG. 1 is a diagram illustrating an example of a schematic configuration of a system according to an embodiment.

Hereinafter, embodiments of the present disclosure will be described in detail with reference to the drawings. It is noted that, in the following embodiments, the same elements are denoted by the same reference numerals, and redundant description will be omitted.

The present disclosure will be described according to the following order of items.

1. Embodiments
1.1 First control mode
1.2 Second control mode
1.3 Third control mode
1.4 Fourth control mode
1.5 Fifth control mode
1.6 Control when additional power amount fluctuates
1.7 Example of processing flow
2. Example of hardware configuration
3. Example of effects

1. Embodiments

FIG. 1 is a diagram illustrating an example of a schematic configuration of a system according to an embodiment. A system 100 includes a sensor 1, a storage device 2, a recognition device 3, a transmission device 4, a control device 5, a storage battery monitoring device 6, a storage battery 7, and an energy harvester 8. As described later, since the energy harvester 8 performs environmental power generation, the system 100 can also be referred to as an energy harvesting system, an environmental power generation system, or the like.

The sensor 1 detects various objects. The sensor 1 may be any type of sensor installed anywhere. For example, the sensor 1 may be a sensor device for Internet of Things (IoT). As to only some examples of the sensor 1, a temperature sensor, a humidity sensor, an illuminance sensor, a human sensor, an atmospheric pressure sensor, a weather sensor, and the like may be the sensor 1. Although one sensor 1 is illustrated in FIG. 1, two or more sensors 1 may be present. During the operation of the system 100, the sensor 1 repeatedly performs detection at, for example, a predetermined cycle or a designated timing. Some detections by the sensor 1 are schematically illustrated as dashed arrows towards the sensor 1.

Data indicating a detection result of the sensor 1 is referred to as data DAT. The data DAT describes, for example, sensor information and a detection result in association with each other. The sensor information may be information for specifying the type (model or the like) of the sensor 1, or may be identification information (sensor ID) for uniquely specifying the sensor 1. For example, when the sensor 1 is a temperature sensor, the data DAT may be data in which sensor information, detection time, and detection temperature are associated with each other.

The data DAT from the sensor 1 is written in the storage device 2 and fetched in the system 100. The storage device 2 stores the written data DAT. In FIG. 1, a write operation of the data DAT from the sensor 1 in the storage device 2 (a fetching operation of the data DAT) is referred to as an "operation A", and is schematically illustrated by an outlined arrow.

The recognition device 3 recognizes the data DAT written in the storage device 2. An example of the recognition is necessity of transmission of the data DAT by the transmission device 4 to be described later. The recognition device 3 recognizes, from a content of the data DAT, whether the data DAT is data DAT that needs to be transmitted. For example, the recognition device 3 recognizes (extracts) data DAT detected at a time, a time zone, or the like at which transmission is required as data DAT that needs to be transmitted. Alternatively, the recognition device 3 recognizes data DAT indicating a value within a predetermined range as data DAT that needs to be transmitted. For the recognition, for example, a data table in which a content of the data DAT is associated with a recognition result may be used, or an algorithm for calculating the recognition result from the content of the data DAT may be used.

The recognition device 3 generates DATrecog corresponding to the data DAT recognized to need to be transmitted, and writes the DATrecog in the storage device 2. The data DATrecog describes, for example, original data DAT and information (for example, a flag or the like) indicating that the data DAT has been recognized in association with each other. When the data DATrecog is written in the storage device 2, the original data DAT is deleted from the storage device 2. The data DATrecog may update (overwrite) the original data DAT. In addition, the data DAT recognized by the recognition device 3 not to need to be transmitted is deleted (discarded) from the storage device 2. The recognition device 3 may collectively recognize a plurality of pieces of data DAT, which will be described below.

In FIG. 1, operations by the recognition device 3, such as recognition of the data DAT, generation of the data DATrecog, writing of the data DATrecog in the storage device 2, and deletion of the original data DAT from the storage device 2, are referred to as an "operation B", and are schematically illustrated by an outlined arrow.

The transmission device 4 transmits the data DATrecog written in the storage device 2. An example of a transmission destination is a server device (not illustrated) or the like (a cloud computer or the like). The server device or the like receives and collects the data DATrecog from the transmission device 4 via a network. The pieces of collected data DATrecog are variously utilized (analyzed or the like). The data DATrecog transmitted by the transmission device 4 is deleted from the storage device 2.

In FIG. 1, operations such as transmission of the data DATrecog by the transmission device 4 and deletion of the data DATrecog from the storage device 2 are referred to as an "operation C", and are schematically illustrated by an outlined arrow.

The control device 5 performs overall control of the system 100. The control by the control device 5 includes control of the above-described operations A to C. Details will be described later.

For convenience, the storage battery monitoring device 6, the storage battery 7, and the energy harvester 8 will be described in the order of the energy harvester 8, the storage battery 7, and the storage battery monitoring device 6.

The energy harvester 8 is, for example, an environmental power generation device that performs environmental power generation using natural energy. Various types of environmental power generation may be used. As just a few examples, solar power generation, vibration power generation, and the like may be performed by the energy harvester 8. Hereinafter, the generated power of the energy harvester 8 may be referred to as "environmentally generated power" in some cases. The storage battery 7 is charged with the environmentally generated power. The power amount charged in the storage battery 7 may be referred to as "additional power amount".

The storage battery 7 is charged with the above-described environmentally generated power and discharges (supplies) power consumed by the operation of the system 100. The disclosed technology particularly relates to the power consumed by the above-described operations A to C among operations of the system 100. In the following descriptions, it is assumed that power consumed by operations other than the operations A to C in the system 100 is ignored. Examples of other operations include control of the operations A to C by the control device 5, monitoring of the storage battery 7 by the storage battery monitoring device 6, and charging of the storage battery 7 from the energy harvester 8.

The storage battery monitoring device 6 monitors the storage battery 7. For example, the storage battery monitoring device 6 monitors a residual capacity of the storage battery 7. Since a method of monitoring the residual capacity of the storage battery 7 is known, a detailed description thereof will not be given here. Hereinafter, the residual capacity of the storage battery 7 may be simply referred to as a "battery residual amount".

The control device 5 will be described again. The control device 5 controls the operations A to C. The control device 5 controls the operations A to C by transmitting and receiving a control signal, a communication signal, and the like to and from the sensor 1, the storage device 2, the recognition device 3, the transmission device 4, the storage battery monitoring device 6, and the like. For example, the control device 5 controls the sensor 1 and the like so that the operation A is performed. The control device 5 controls the recognition device 3 and the like so that the operation B is performed. The control device 5 controls the transmission device 4 and the like so that the operation C is performed.

For example, the control device 5 controls the operations A to C based on the monitoring result of the storage battery 7 by the storage battery monitoring device 6. An example of the monitoring result of the storage battery 7 is a battery residual amount. Another example of the monitoring result is an additional power amount, which is calculated based on, for example, a change in the battery residual amount. The control device 5 can control the operations A to C even based on a memory residual amount (described later) of the storage device 2.

There is a plurality of control modes for control. The control device 5 controls the operations A to C in at least one control mode out of the plurality of control modes. Hereinafter, unless otherwise specified, the control of the operations A to C by the control device 5 may be simply referred to as "control". Each control mode will be described in order.

1.1 First Control Mode

A first control mode is selected when there is a sufficient battery residual amount (or additional power amount). For example, the control device 5 performs control in the first control mode when the battery residual amount is equal to or larger than a first level. An example of the first level is a power amount consumed when three operations including the operation A to the operation C are simultaneously performed. The first level is not necessarily fixed to one value. For example, the first level may be dynamically changed depending on the situation of the system 100 or the like. In the first control mode, the control device 5 performs control so that at least one of the operation B and the operation C for the previously processed data DAT from the sensor 1 is performed in preference to the operation A for the data DAT from the sensor 1.

FIG. 2 is a diagram illustrating an example of control including the control in the first control mode. A "battery residual amount (before operation)" is a battery residual amount after charging with the additional power amount. A "battery residual amount (after operation)" is a battery residual amount after discharging power consumption of the operation A to the operation C (some or all of the operations may not be performed depending on the time) performed at that time. The unit of the power amount is an arbitrary unit a.u. It is assumed that the power amount required for each of the operation A to the operation C is 1.0. The additional power amount is 10.0 in any of time t1 to time t10. It is assumed that the battery residual amount at the beginning (before time t1) is 0.0.

Data DAT1 to data DAT6 are exemplified as newly fetched data DAT. It is assumed that the recognition device 3 recognizes that the data DAT1, the data DAT2, the data DAT4, and the data DAT6 need to be transmitted, and the recognition device 3 recognizes that the data DAT3 and the data DAT5 do not need to be transmitted (can be destroyed). DATrecog corresponding to each of the DAT1, the data DAT2, the data DAT4, and the data DAT6 is referred to as data DATrecog1, data DATrecog2, data DATrecog4, and data DATrecog6.

At time t1, the battery residual amount (before operation) becomes 10.0 due to the additional power amount of 10.0. The control device 5 performs control so that the operation A for the new data DAT1 is performed. The power amount of 1.0 is consumed by the operation A, and the battery residual amount (after the operation) becomes 9.0.

At time t2, the battery residual amount becomes 19.0 due to the additional power amount of 10.0. The control device 5 performs control so that the operation B for the data DAT1 and the operation A for the new data DAT2 are performed. The power amount of 2.0 is consumed by the operation B and the operation A, and the battery residual amount becomes 17.0.

At time t3, the battery residual amount becomes 27.0 due to the additional power amount of 10.0. The control device 5 performs control so that the operation C for the data DATrecog1, the operation B for the data DAT2, and the operation A for the new data DAT3 are performed. The power amount of 3.0 is consumed by the operation C to the operation A, and the battery residual amount becomes 24.0.

At time t4, the battery residual amount becomes 34.0 due to the additional power amount of 10.0. The control device 5 performs control so that the operation C for the data DATrecog2, the operation B for the data DAT3, and the operation A for the new data DAT4 are performed. The power amount of 3.0 is consumed by the operation C to the operation A, and the battery residual amount becomes 31.0.

At time t5, the battery residual amount becomes 41.0 due to the additional power amount of 10.0. The control device 5 performs control so that the operation B for the DAT4 and the operation A for the new data DAT5 are performed. The power amount of 2.0 is consumed by the operation B and the operation A, and the battery residual amount becomes 39.0.

At time t6, the battery residual amount becomes 49.0 due to the additional power amount of 10.0. The control device 5 performs control so that the operation C for the data DATrecog4, the operation B for the data DAT5, and the operation A for the new data DAT6 are performed. The power amount of 3.0 is consumed by the operation C to the operation A, and the battery residual amount becomes 46.0.

It is assumed that there is no new data DAT from time t7. At time t7, the battery residual amount becomes 56.0 due to the additional power amount of 10.0. The control device 5 performs control so that the operation B for the data DAT6 is performed. The power amount of 1.0 is consumed by the operation B, and the battery residual amount becomes 55.0.

At time t8, the battery residual amount becomes 65.0 due to the additional power amount of 10.0. The control device 5 performs control so that the operation C for the data DATrecog6 is performed. The power amount of 1.0 is consumed by the operation C, and the battery residual amount becomes 64.0.

At time t9, the battery residual amount becomes 74.0 due to the additional power amount of 10.0. No particular operation is performed.

At time t10, the battery residual amount becomes 84.0 due to the additional power amount of 10.0. No particular operation is performed.

For example, when there is a sufficient battery residual amount as described above, the operations A to C for the same data DAT are simply performed in this order by the first control mode. It is possible to completely fetch and recognize the data DAT from the sensor 1 and transmit the data DAT as necessary.

As described above, a power source of each of the operation A to the operation C is the generated power of the energy harvester 8. The surrounding environment changes depending on an arrangement place, a time (a time zone), and the like of the energy harvester 8 provided together with the sensor 1, and the generated power amount can vary. For example, in a case where the energy harvester 8 is a solar power generator, the generated power amount may be reduced in a case where the weather is cloudy or in a case where room light is not sufficient. The battery residual amount also fluctuates due to fluctuation in the generated power amount, and as a result, there is a possibility that the battery residual amount becomes insufficient. If the generated power amount or the battery residual amount is insufficient, the control in the first control mode described above may not be performed in some cases. In order to cope with this situation, there are control modes other than the first control mode.

1.2 Second Control Mode

A second control mode is selected when there is no sufficient battery residual amount (or additional power amount), in other words, when the battery residual amount may be insufficient. For example, the control device 5 performs control in the second control mode in a case where the battery residual amount is less than the first level, more specifically, in a case where the battery residual amount is less than the first level and equal to or larger than a second level. An example of the second level is a consumed power amount when, among the operations A to C, two of the operations including the operation A are simultaneously performed. The second level is not necessarily fixed to one value, and may be dynamically changed depending on, for example, the situation of the system 100 or the like. In the second control mode, the control device 5 performs control so that the operation A for the data DAT from the sensor 1 is performed in preference to the operation B and the operation C for the previously processed data DAT from the sensor 1. In addition, in the operation B and the operation C for the previously processed data DAT, the control device 5 may perform control so that the operation C is preferentially performed. By performing the operation C in preference to the operation B, the transmission of the data DAT can be preferentially completed. A transmission delay of the data DAT is minimized.

FIG. 3 is a diagram illustrating an example of control including control in the second control mode. The additional power amount is 2.0 in any of time t11 to time t20.

At time t11, the battery residual amount becomes 2.0 due to the additional power amount of 2.0. The control device 5 performs control so that the operation A for the new data DAT1 is performed. The power amount of 1.0 is consumed by the operation A, and the battery residual amount becomes 1.0.

At time t12, the battery residual amount becomes 3.0 due to the additional power amount of 2.0. The control device 5 performs control so that the operation B for the data DAT1 and the operation A for the new data DAT2 are performed. The power amount of 2.0 is consumed by the operation B and the operation A, and the battery residual amount becomes 1.0.

At time t13, the battery residual amount becomes 3.0 due to the additional power amount of 2.0. The control device 5 performs control so that the operation C for the data DATrecog1, the operation A for the new data DAT3, and the operation B for the data DAT2 are performed. The power amount of 3.0 is consumed by the operation C to the operation A, and the battery residual amount becomes 0.0.

At time t14, the battery residual amount becomes 2.0 due to the additional power amount of 2.0. The control device 5 performs control so that the operation A for the new data DAT4 and the operation C for the data DATrecog2 are performed. The operation B for the previously fetched data DAT3 is delayed. The power amount of 2.0 is consumed by the operation A and the operation C, and the battery residual amount becomes 0.0.

At time t15, the battery residual amount becomes 2.0 due to the additional power amount of 2.0. The control device 5 performs control so that the operation A for the new data DAT5 and the operation B for the data DAT3 are performed. The power amount of 2.0 is consumed by the operation A and the operation B, and the battery residual amount becomes 0.0.

At time t16, the battery residual amount becomes 2.0 due to the additional power amount of 2.0. The control device 5 performs control so that the operation A for the new data DAT6 and the operation B for the data DAT4 are performed. The power amount of 2.0 is consumed by the operation A and the operation B, and the battery residual amount becomes 0.0.

It is assumed that there is no new data DAT from time t17. At time t17, the battery residual amount becomes 2.0 due to the additional power amount of 2.0. The control device 5 performs control so that the operation C for the data DATrecog4 and the operation B for the data DAT5 are performed. The power amount of 2.0 is consumed by the operation C and the operation B, and the battery residual amount becomes 0.0.

At time t18, the battery residual amount becomes 2.0 due to the additional power amount of 2.0. The control device 5 performs control so that the operation B for the data DATrecog6 is performed. The power amount of 1.0 is consumed by the operation B, and the battery residual amount becomes 1.0.

At time t19, the battery residual amount becomes 3.0 due to the additional power amount of 2.0. The control device 5 performs control so that the operation C for the data DATrecog6 is performed.

At time t20, the battery residual amount becomes 4.0 due to the additional power amount of 2.0. No particular operation is performed.

For example, as described above, in a case where the battery residual amount may be insufficient, the operation A is performed in preference to the operation B or the operation C for the previously processed data DAT by the second control mode. Specifically, in the above example, at time t14, control is performed so that the operation A for the data DAT4 is performed in preference to the operation B for the data D3 and the operation C for the data D2 by the second control mode. The operation C for the data D2 is performed in preference to the operation B for the data D3. When the operation B for the data D3 and the operation C for the data D4 are preferentially performed instead of the operation A for the data D4, the battery residual amount is insufficient and the operation A cannot be performed, and the data DAT4 cannot be fetched. Such a loss of the data DAT is suppressed by the second control mode. This is also apparent from comparative example described below with reference to FIG. 4.

FIG. 4 is a diagram illustrating the comparative example. From time t11E to time t20E, the additional power amount is 2.0 similarly to FIG. 3 described above. However, in the comparative example, only the control in the first control mode is performed.

At time t11E, the battery residual amount becomes 2.0 due to the additional power amount of 2.0. The operation A for the new data DAT1 is performed. The power amount of 1.0 is consumed by the operation A, and the battery residual amount becomes 1.0.

At time t12E, the battery residual amount becomes 3.0 due to the additional power amount of 2.0. The operation B for the data DAT1 and the operation A for the new data DAT2 are performed. The power amount of 2.0 is consumed by the operation B and the operation A, and the battery residual amount becomes 1.0.

At time t13E, the battery residual amount becomes 3.0 due to the additional power amount of 2.0. The operation C for the data DATrecog1, the operation B for the data DAT2, and the operation A for the new data DAT3 are performed. The power amount of 3.0 is consumed by the operation C to the operation A, and the battery residual amount becomes 0.0.

At time t14E, the battery residual amount becomes 2.0 due to the additional power of 2.0. The operation C for the data DATrecog2 and the operation B for the data DAT3 are performed. At this point, the battery residual amount is exhausted, so that the operation A cannot be performed. Therefore, new data DAT cannot be fetched, and a loss of the data DAT occurs.

At time t15E, the battery residual amount becomes 2.0 due to the additional power amount of 2.0. The operation A for the new data DAT4 is performed. The power amount of 1.0 is consumed by the operation A, and the battery residual amount becomes 1.0.

At time t16E, the battery residual amount becomes 3.0 due to the additional power amount of 2.0. The operation B for the data DAT4 and the operation A for the new data DAT6 are performed. The power amount of 2.0 is consumed by the operation B and the operation A, and the battery residual amount becomes 1.0.

At time t17E, the battery residual amount becomes 3.0 due to the additional power amount of 2.0. The operation C for the data DATrecog4, the operation B for the data DAT5, and the operation A for the new data DAT6 are performed. The power amount of 2.0 is consumed by the operation C to the operation A, and the battery residual amount becomes 0.0.

It is assumed that there is no new data DAT from time t18E. At time t18E, the battery residual amount becomes 2.0 due to the additional power amount of 2.0. The operation B for the data DAT6 is performed. The power amount of 1.0 is consumed by the operation B, and the battery residual amount becomes 1.0.

At time t19E, the battery residual amount becomes 3.0 due to the additional power amount of 2.0. The operation C for the data DATrecog6 is performed. The power amount of 1.0 is consumed by the operation C, and the battery residual amount becomes 2.0.

At time t20E, the battery residual amount becomes 4.0 due to the additional power amount of 2.0. No particular operation is performed.

For example, as described above, in the comparative example, at time t14E, the operation C for the data DATrecog2 and the operation B for the data DAT3 are preferentially performed, and the battery residual amount is exhausted. Therefore, the operation A for the new data DAT cannot be performed, and a loss of the data DAT occurs. Such a loss of the data DAT is suppressed by the second control mode as described above with reference to FIG. 3.

1.3 Third Control Mode

A third control mode is selected in a case where the battery residual amount (or additional power amount) can be further insufficient. For example, the control device 5 performs control in the second control mode in a case where the battery residual amount is less than the second level, more specifically, in a case where the battery residual amount is less than the second level and equal to or larger than a third level. An example of the third level is a power amount consumed when one of the operation A to the operation C, more specifically, the operation A is performed. The third level is not necessarily fixed to one value, and may be dynamically changed depending on, for example, the situation of the system 100. In the third control mode, in addition to the contents of the above-described second control mode, in a case where a plurality of pieces of data DAT is written in the storage device 2, the control device 5 performs control so that the operation B is collectively performed on the plurality of pieces of data DAT.

In this case, the recognition device 3 collectively recognizes the plurality of pieces of data DAT written in the storage device 2. When at least one data DAT of the plurality of pieces of data DAT is the data DAT that needs to be transmitted, one data DATrecog (compressed data) corresponding to the plurality of pieces of data DAT is generated. By transmitting the data DATrecog obtained as described above, it is possible to transmit information on the plurality of pieces of data DAT at a time. However, there is a possibility that accuracy in the time direction deteriorates. For example, there is a possibility that it is not possible to accurately grasp which data DAT acquired at which timing among the plurality of pieces of original data DAT corresponds to certain information included in the data DATrecog. Nevertheless, it is still possible to obtain an advantage of suppressing a loss of the data DAT.

For example, after a predetermined number of pieces of data DAT are written in the storage device 2, the control device 5 may perform control so that the operation B is collectively performed on the predetermined number of pieces of data DAT. This will be described with reference to FIG. 5.

FIG. 5 is a diagram illustrating an example of control including control in the third control mode. The additional power amount is 1.5 in any of time t21 to time t30. In this example, the operation B is collectively performed on the two pieces of data DAT.

At time t21, the battery residual amount becomes 1.5 due to the additional power amount of 1.5. The control device 5 performs control so that the operation A for the new data DAT1 is performed. The power amount of 1.0 is consumed by the operation A, and the battery residual amount becomes 0.5.

At time t22, the battery residual amount becomes 2.0 due to the additional power amount of 1.5. The control device 5 performs control so that the operation A for the new data DAT2 is performed. The power amount of 1.0 is consumed by the operation A, and the battery residual amount becomes 1.0.

At time t23, the battery residual amount becomes 2.5 due to the additional power amount of 1.5. The control device 5 performs control so that the operation A for the new data DAT3 is performed and the operation B is collectively performed on the data DAT1 and the data DAT2. The data DAT1 and the data DAT2 after being collectively recognized are referred to as data DATrecog12 and illustrated. The power amount of 2.0 is consumed by the operation A and the operation B, and the battery residual amount becomes 0.5.

At time t24, the battery residual amount becomes 2.0 due to the additional power amount of 1.5. The control device 5 performs control so that the operation A for the new data DAT4 and the operation C for the data DATrecog12 are performed. The power amount of 2.0 is consumed by the operation A and the operation C, and the battery residual amount becomes 0.0.

At time t25, the battery residual amount becomes 1.5 due to the additional power amount of 1.5. The control device 5 performs control so that the operation A for the new data DAT5 is performed. The power amount of 1.0 is consumed by the operation A, and the battery residual amount becomes 0.5.

At time t26, the battery residual amount becomes 2.0 due to the additional power amount of 1.5. The control device 5 performs control so that the operation A for the new data DAT6 is performed and the operation B is collectively performed on the data DAT3 and the data DAT4. The data DAT3 and the data DAT4 after being collectively recognized are referred to as data DATrecog34 and illustrated. The power amount of 2.0 is consumed by the operation A and the operation B, and the battery residual amount becomes 0.0.

It is assumed that there is no new data DAT from time t27. At time t27, the battery residual amount becomes 1.5 due to the additional power amount of 1.5. The control device 5 performs control so that the operation C for the data DATrecog34 is performed. The power amount of 2.0 is consumed by the operation C, and the battery residual amount becomes 0.5.

At time t28, the battery residual amount becomes 2.0 due to the additional power amount of 1.5. The control device 5 performs control so that the operation B is collectively performed on the data DAT5 and the data DAT6. The data DAT5 and the data DAT6 after being collectively recognized are referred to as data DATrecog56 and illustrated. The power amount of 1.0 is consumed by the operation B, and the battery residual amount becomes 1.0.

At time t29, the battery residual amount becomes 2.5 due to the additional power amount of 1.5. The control device 5 performs control so that the operation C for the DATrecog56 is performed. The power amount of 1.0 is consumed by the operation C, and the battery residual amount becomes 1.5.

At time t30, the battery residual amount becomes 3.0 due to the additional power amount of 1.5. No particular operation is performed.

For example, as described above, when the additional power may be insufficient, the operation B is collectively performed on the plurality of pieces of data DAT in the third control mode. Specifically, in the above example, at time t23, the operation B is collectively performed on the data DAT1 and the data DAT2. At time t26, the operation B is collectively performed on the data DAT3 and the data DAT4. At time t28, the operation B is collectively performed on the data DAT5 and the data DAT6. As a result, for example, the power amount consumed by the operation B can be reduced as compared with a case in which the operation B is performed on each of the DAT1 to the data DAT6. Therefore, the battery residual amount for performing the operation A can be secured, and the loss of the DAT can be suppressed.

The control device 5 may perform control so that the operation B is collectively performed on all the data DAT written in the storage device 2 by the timing when the operation B can be performed. This will be described with reference to FIG. 6.

FIG. 6 is a diagram illustrating an example of control including control in the third control mode. Since time t31 is similar to time t21 in FIG. 5 described above, a description thereof will not be repeated.

At time t32, the battery residual amount becomes 2.0 due to the additional power amount of 1.5. The control device 5 performs control so that the operation A for the new data DAT2 and the operation B for the data DAT are performed. The power amount of 2.0 is consumed by the operation A and the operation B, and the battery residual amount becomes 0.0.

At time t33, the battery residual amount becomes 1.5 due to the additional power amount of 1.5. The control device 5 performs control so that the operation A for the new data DAT3 is performed. The power amount of 1.0 is consumed by the operation A, and the battery residual amount becomes 0.5.

At time t34, the battery residual amount becomes 2.0 due to the additional power amount of 1.5. The control device 5 performs control so that the operation A for the new data DAT4 and the operation C for the data DATrecog1 are performed. The power amount of 2.0 is consumed by the operation A and the operation C, and the battery residual amount becomes 0.0.

At time t35, the battery residual amount becomes 1.5 due to the additional power amount of 1.5. The control device 5 performs control so that the operation A for the new data DAT5 is performed. The power amount of 1.0 is consumed by the operation A, and the battery residual amount becomes 0.5.

At time t36, the battery residual amount becomes 2.0 due to the additional power amount of 1.5. The control device 5 performs control so that the operation A for the new data DAT6 is performed and the operation B is collectively performed on the data DAT2 to the data DAT5. The data DAT2 to the data DAT5 after being collectively recognized are referred to as data DATrecog2345 and illustrated. The power amount of 2.0 is consumed by the operation A and the operation B, and the battery residual amount becomes 0.0.

It is assumed that there is no new data DAT from time t37. At time t37, the battery residual amount becomes 1.5 due to the additional power amount of 1.5. The control device 5 performs control so that the operation C for the data DATrecog2345 is performed. The power amount of 1.0 is consumed by the operation C, and the battery residual amount becomes 0.5.

At time t38, the battery residual amount becomes 2.0 due to the additional power amount of 1.5. The control device 5 performs control so that the operation B for the data DAT6 is performed. The power amount of 1.0 is consumed by the operation B, and the battery residual amount becomes 1.0.

At time t39, the battery residual amount becomes 2.5 due to the additional power amount of 1.5. The control device 5 performs control so that the operation C for the data DATrecog6 is performed. The power amount of 1.0 is consumed by the operation C, and the battery residual amount becomes 1.5.

At time t40, the battery residual amount becomes 3.0 due to the additional power amount of 1.5. No particular operation is performed.

In the above example, at time t36, the operation B is collectively performed on the data DAT2 to the data DAT5. As a result, for example, the power amount consumed by the operation B can be reduced as compared with a case in which the operation B is performed on each of the DAT2 to the data DAT5. Therefore, the battery residual amount for performing the operation A can be secured, and a loss of the data DAT can be suppressed.

When the additional power is further insufficient, the operation B is collectively performed on the larger number of pieces of data DAT. This will be described with reference to FIGS. 7 and 8.

FIG. 7 is a diagram illustrating an example of control including control in the third control mode. The additional power amount is 1.0 in any of time t41 to time t50. In this example, the operation B is collectively performed on the three pieces of data DAT.

At time t41, the battery residual amount becomes 1.0 due to the additional power amount of 1.0. The control device 5 performs control so that the operation A for the new data DAT1 is performed. The power amount of 1.0 is consumed by the operation A, and the battery residual amount becomes 0.0.

At time t42, the battery residual amount becomes 1.0 due to the additional power amount of 1.0. The control device 5 performs control so that the operation A for the new data DAT2 is performed. The power amount of 1.0 is consumed by the operation A, and the battery residual amount becomes 0.0.

At time t43, the battery residual amount becomes 1.0 due to the additional power amount of 1.0. The control device 5 performs control so that the operation A for the new data DAT3 is performed. The power amount of 1.0 is consumed by the operation A, and the battery residual amount becomes 0.0.

At time t44, the battery residual amount becomes 1.0 due to the additional power amount of 1.0. The control device 5 performs control so that the operation A for the new data DAT4 is performed. The power amount of 1.0 is consumed by the operation A, and the battery residual amount becomes 0.0.

At time t45, the battery residual amount becomes 1.0 due to the additional power amount of 1.0. The control device 5 performs control so that the operation A for the new data DAT5 is performed. The power amount of 1.0 is consumed by the operation A, and the battery residual amount becomes 0.0.

At time t46, the battery residual amount becomes 1.0 due to the additional power amount of 1.0. The control device 5 performs control so that the operation A for the new data DAT6 is performed. The power amount of 1.0 is consumed by the operation A, and the battery residual amount becomes 0.0.

It is assumed that there is no new data DAT from time t47. At time t47, the battery residual amount becomes 1.0 due to the additional power amount of 1.0. The control device 5 performs control so that the operation B is collectively performed on the data DAT1 to the data DAT3. The data DAT1 to the data DAT3 after being collectively recognized are referred to as data DATrecog123 and illustrated. The power amount of 1.0 is consumed by the operation B, and the battery residual amount becomes 0.0.

At time t48, the battery residual amount becomes 1.0 due to the additional power amount of 1.0. The control device 5 performs control so that the operation C is performed on the data DATrecog123. The power amount of 1.0 is consumed by the operation C, and the battery residual amount becomes 0.0.

At time t49, the battery residual amount becomes 1.0 due to the additional power amount of 1.0. The control device 5 performs control so that the operation B is collectively performed on the data DAT4 to the data DAT6. The data DAT4 to the data DAT6 after being collectively recognized are referred to as data DATrecog456 and illustrated. The power amount of 1.0 is consumed by the operation B, and the battery residual amount becomes 0.0.

At time t50, the battery residual amount becomes 1.0 due to the additional power amount of 1.0. The control device 5 performs control so that the operation C is performed on the data DATrecog456. The power amount of 1.0 is consumed by the operation C, and the battery residual amount becomes 0.0.

In the above example, the operation B is collectively performed on the data DAT1 to the data DAT3 at time t47, and the operation B is collectively performed on the data DAT4 to the data DAT6 at time t49. As a result, for example, the power amount consumed by the operation B can be reduced as compared with a case in which the operation B is performed on each of the DAT1 to the data DAT6. Therefore, the battery residual amount for performing the operation A can be secured, and a loss of the data DAT can be suppressed.

FIG. 8 is a diagram illustrating an example of control including control in the third control mode. The operation B is collectively performed on all the data DAT written in the storage device 2 by the timing when the operation B can be performed. The period from time t51 to time t56 is the same as the period from time t41 to time t46 in FIG. 7 described above, and thus a description thereof will not be repeated.

It is assumed that there is no new data DAT from time t57. At time t57, the battery residual amount becomes 1.0 due to the additional power amount of 1.0. The control device 5 performs control so that the operation B is collectively performed on the data DAT1 to the data DAT6. The data DAT1 to the data DAT6 after being collectively recognized are referred to as data DATrecog123456 and illustrated. The power amount of 1.0 is consumed by the operation B, and the battery residual amount becomes 0.0.

At time t58, the battery residual amount becomes 1.0 due to the additional power amount of 1.0. The control device 5 performs control so that the operation C is performed on the data DATrecog123456. The power amount of 1.0 is consumed by the operation C, and the battery residual amount becomes 0.0.

At time t59, the battery residual amount becomes 1.0 due to the additional power amount of 1.0. No particular operation is performed.

At time t60, the battery residual amount becomes 2.0 due to the additional power amount of 1.0. No particular operation is performed.

In the above example, at time t57, the operation B is collectively performed on the data DAT1 to the data DAT6. As a result, for example, the power amount consumed by the operation B can be reduced as compared with a case in which the operation B is performed on each of the DAT1 to the data DAT6. Therefore, it is possible to secure the power amount for performing the operation A and to suppress a loss of the data DAT.

1.4 Fourth Control Mode

A fourth control mode is selected in a case where there is no free space in a remaining storage capacity (hereinafter, simply referred to as a "memory") in the storage device 2, that is, in a case where a memory residual amount may be insufficient. For example, the control device 5 performs control in the fourth control mode in a case where the memory residual amount is less than a predetermined amount. For easy understanding, the memory residual amount necessary for writing one data DAT or the data DATrecog is both expressed as "1R". In the fourth control mode, the control device 5 performs control so that the operation C is preferentially performed. It is noted that the operation B before the operation C is necessarily performed. Since the operation C is preferentially performed, the data DATrecog and the original data DAT are deleted from the storage device 2, and as such shortage of a memory size is resolved.

Examples of the predetermined amount include 2R, 1R, and the like. For example, when the data DAT after the operation B is performed, that is, the data DATrecog is written in the storage device 2, the predetermined amount may be 1R. This is because the memory residual amount can be recovered by performing the operation C for the data DATrecog. When only the data DAT is written in the storage device 2, the predetermined amount may be 2R. This is because the memory residual amount for performing the operation B and further writing the data DATrecog in the storage device 2 is required before the operation C. The predetermined amount does not necessarily need to be fixed to those values, and may be dynamically changed depending on, for example, the situation of the system 100 or the like.

FIG. 9 is a diagram illustrating an example of control including control in the fourth control mode. The additional power amount is 1.0 in any of time t61 to time t70. It is assumed that an initial memory residual amount (before time t61) is 4R.

At time t61, the battery residual amount becomes 1.0 due to the additional power amount of 1.0. The memory residual amount (before operation) is 4R. The control device 5 performs control so that the operation A for the new data DAT1 is performed. The power amount of 1.0 is consumed by the operation A, and the battery residual amount becomes 0.0.

At time t62, the battery residual amount becomes 1.0 due to the additional power amount of 1.0. The memory residual amount is 3R. The control device 5 performs control so that the operation A for the new data DAT2 is performed. The power amount of 1.0 is consumed by the operation A, and the battery residual amount becomes 0.0.

At time t63, the battery residual amount becomes 1.0 due to the additional power amount of 1.0. The memory residual amount is 2R. The control device 5 performs control so that the operation A for the new data DAT3 is performed. The power amount of 1.0 is consumed by the operation A, and the battery residual amount becomes 0.0.

At time t64, the battery residual amount becomes 1.0 due to the additional power amount of 1.0. The memory residual amount is 1R. The control device 5 performs control so that the operation B is preferentially performed on the data DAT1 to the data DAT3. Although the operation A is not performed and a loss of new data DAT occurs, the data DAT1 to the data DAT3, which are the basis of the data DATrecog123, are deleted from the storage device 2, and the memory residual amount is recovered. The power amount of 1.0 is consumed by the operation B, and the battery residual amount becomes 0.0.

At time t65, the battery residual amount becomes 1.0 due to the additional power amount of 1.0. The memory residual amount is 3R. The control device 5 performs control so that the operation A for the new data DAT4 is performed. The power amount of 1.0 is consumed by the operation A, and the battery residual amount becomes 0.0.

At time t66, the battery residual amount becomes 1.0 due to the additional power amount of 1.0. The memory residual amount is 2R. The control device 5 performs control so that the operation A for the new data DAT5 is performed. The power amount of 1.0 is consumed by the operation A, and the battery residual amount becomes 0.0.

At time t67, the battery residual amount becomes 1.0 due to the additional power amount of 1.0. The memory residual amount is 1R. The control device 5 performs control so that the operation A for the new data DAT6 is performed.

It is assumed that there is no new data DAT from time t68. At time t68, the battery residual amount becomes 1.0 due to the additional power amount of 1.0. The memory residual amount is 0R. The control device 5 performs control so that the operation C for the data DATrecog123 is performed. The data DATrecog123 is deleted from the storage device 2, and the memory residual amount is recovered. The power amount of 1.0 is consumed by the operation C, and the battery residual amount becomes 0.0.

At time t69, the battery residual amount becomes 1.0 due to the additional power amount of 1.0. The memory residual amount is 1R. The control device 5 performs control so that the operation B is preferentially and collectively performed on the data DATrecog456. Although the operation A is not performed and a loss of new data DAT occurs, the data DAT4 to the data DAT6, which are the basis of the data DATrecog456, are deleted from the storage device 2, and the memory residual amount is recovered. The power amount of 1.0 is consumed by the operation C, and the battery residual amount becomes 0.0.

At time t70, the battery residual amount becomes 1.0 due to the additional power amount of 1.0. The memory residual amount is 3R. The control device 5 performs control so that the operation C for the data DATrecog456 is performed. The power amount of 1.0 is consumed by the operation C, and the battery residual amount becomes 0.0.

In the above example, at time t64, in order to preferentially perform the operation C for the previously processed data DAT1 to DAT3 instead of the operation A for the new data DAT, the operation B is performed on the previously processed data DAT1 to DAT3 by the fourth control mode. Although a loss of the data DAT occurs, the memory residual amount is recovered by the amount of loss, and the operation A is performed on the new data DAT at the subsequent time t65 to time t67. Therefore, a loss of the data DAT can be suppressed.

1.5 Fifth Control Mode

A fifth control mode is selected in a case where the battery residual amount (or additional power amount) can be further insufficient. For example, the control device 5 performs control in the fifth control mode when the battery residual amount is less than the third level. In the fifth control mode, in addition to the contents of the above-described third control mode (further, the fourth control mode), the control device 5 performs control so that the operation A for the data DAT from the sensor 1 and the operation B and the operation C for the previously processed data DAT from the sensor 1 are not performed. It can also be said that the operation A intermittently operates.

FIG. 10 is a diagram illustrating an example of control including control in the fifth control mode. The additional power amount is 0.8 in any of time t71 to time t80.

At time t71, the battery residual amount becomes 0.8 due to the additional power amount of 0.8. The control device 5 performs control so that the operation A is not performed. A loss of the new data DAT occurs.

At time t72, the battery residual amount becomes 1.6 due to the additional power amount of 0.8. The control device 5 performs control so that the operation A for the new data DAT1 is performed. The power amount of 1.0 is consumed by the operation A, and the battery residual amount becomes 0.6.

At time t73, the battery residual amount becomes 1.4 due to the additional power amount of 0.8. The control device 5 performs control so that the operation A for the new data DAT2 is performed. The power amount of 1.0 is consumed by the operation A, and the battery residual amount becomes 0.4.

At time t74, the battery residual amount becomes 1.2 due to the additional power amount of 0.8. The control device 5 performs control so that the operation A for the new data DAT3 is performed. The power amount of 1.0 is consumed by the operation A, and the battery residual amount becomes 0.2.

At time t75, the battery residual amount becomes 1.0 due to the additional power amount of 0.8. The control device 5 performs control so that the operation A for the new data DAT4 is performed. The power amount of 1.0 is consumed by the operation A, and the battery residual amount becomes 0.0.

At time t76, the battery residual amount becomes 0.8 due to the additional power amount of 0.8. The control device 5 performs control so that the operation A is not performed. A loss of the new data DAT occurs.

At time t77, the battery residual amount becomes 1.6 due to the additional power amount of 0.8. The control device 5 performs control so that the operation A for the new data DAT5 is performed. The power amount of 1.0 is consumed by the operation A, and the battery residual amount becomes 0.6.

At time t78, the battery residual amount becomes 1.6 due to the additional power amount of 0.8. The control device 5 performs control so that the operation A for the new data DAT6 is performed. The power amount of 1.0 is consumed by the operation A, and the battery residual amount becomes 0.4.

It is assumed that there is no new data DAT from time t79. At time t79, the battery residual amount becomes 1.2 due to the additional power amount of 0.8. The control device 5 performs control so that the operation B is performed on the data DAT1 to the data DAT6. The power amount of 1.0 is consumed by the operation B, and the battery residual amount becomes 0.2.

It is assumed that there is no new data DAT from time t80. At time t80, the battery residual amount becomes 1.0 due to the additional power amount of 0.8. The control device 5 performs control so that the operation C for the data DATrecog123456 is performed. The power amount of 1.0 is consumed by the operation C, and the battery residual amount becomes 0.0.

In the above example, the fifth control mode is selected at time t71 and time t76, and control is performed so that the operation A for the new data DAT is not performed. Although a loss of the new data DAT occurs, the operation A is performed on the new data DAT at the subsequent times t72 to t75, t77, and t78. Therefore, a loss of the data DAT can be suppressed.

1.6 Control when Additional Power Amount Fluctuates

As described above, in practice, the generated power amount by the energy harvester 8, that is, the additional power amount fluctuates. An example will be described with reference to FIG. 11.

FIG. 11 is a diagram illustrating an example of control when the additional power amount fluctuates. At time t81, the battery residual amount becomes 1.0 due to the additional power amount of 1.0. The control device 5 performs control so that the operation A for the new data DAT1 is performed. The power amount of 1.0 is consumed by the operation A, and the battery residual amount becomes 0.0.

At time t82, the battery residual amount becomes 1.5 due to the additional power amount of 1.5. The control device 5 performs control so that the operation A for the new data DAT2 is performed. The power amount of 1.0 is consumed by the operation A, and the battery residual amount becomes 0.5.

At time t83, the battery residual amount becomes 2.0 due to the additional power amount of 1.5. The control device 5 performs control so that the operation A for the new data DAT3 is performed and the operation B is collectively performed on the data DAT1 and the data DAT. The power amount of 2.0 is consumed by the operation A and the operation B, and the battery residual amount becomes 0.0.

At time t84, the battery residual amount becomes 2.0 due to the additional power amount of 2.0. The control device 5 performs control so that the operation A for the new data DAT3 is performed. The power amount of 2.0 is consumed by the operation A and the operation B, and the battery residual amount becomes 0.0.

At time t85, the battery residual amount becomes 2.0 due to the additional power amount of 2.0. The control device 5 performs control so that the operation A is performed on the new data DAT5 and the operation B is collectively performed on the data DAT3 and the data DAT4. The power amount of 2.0 is consumed by the operation A and the operation B, and the battery residual amount becomes 0.0.

At time t86, the battery residual amount becomes 3.0 due to the additional power amount of 3.0. The control device 5 performs control so that the operation A for the new data DAT6, the operation C for the data DATrecog34, and the operation B for the data DAT5 are performed. The power amount 3.0 is consumed by the operation A, the operation C, and the operation B, and the battery residual amount becomes 0.0.

At time t87, the battery residual amount becomes 3.0 due to the additional power amount of 3.0. The control device 5 performs control so that the operation B for the new data DAT6 is performed. The power amount of 1.0 is consumed by the operation B, and the battery residual amount becomes 2.0.

It is assumed that there is no new data DAT from time t88. At time t88, the battery residual amount becomes 6.0 due to the additional power amount of 4.0. The control device 5 performs control so that the operation C for the data DATrecog6 is performed. The power amount of 1.0 is consumed by the operation B, and the battery residual amount becomes 5.0.

At time t89, the battery residual amount becomes 9.0 due to the additional power amount of 4.0. No particular operation is performed.

At time t90, the battery residual amount becomes 14.0 due to the additional power amount of 5.0. No particular operation is performed.

For example, as described above, various types of control are performed depending on the fluctuation in the additional power amount or the like, and the loss of the data DAT is suppressed.

1.7 Example of Processing Flow

Figure 12:
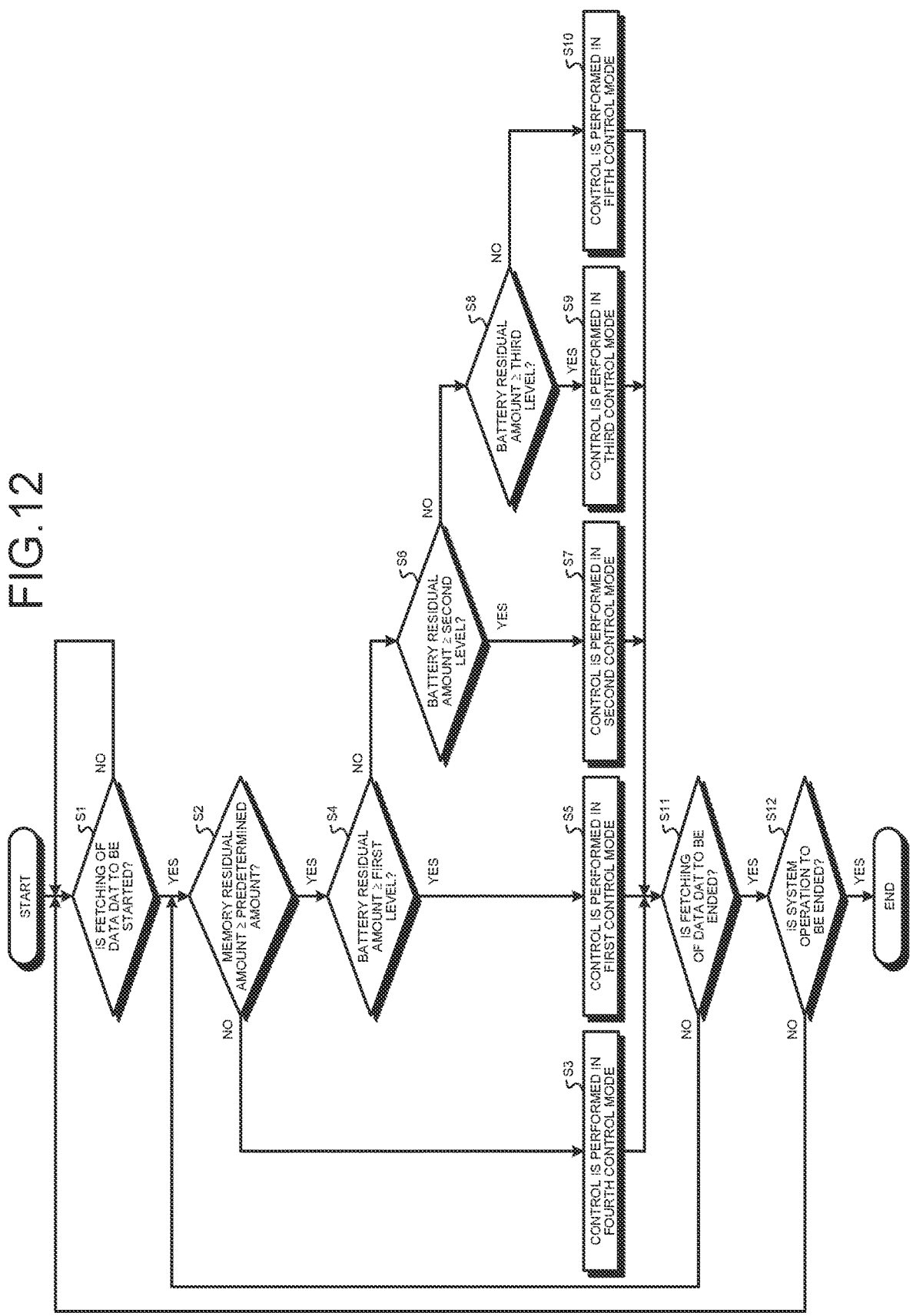
FIG. 12 is a flowchart illustrating an example of processing executed in a control device.

FIG. 12 is a flowchart illustrating an example of processing (control method) executed in the control device.

In step S1, the control device 5 determines whether to start fetching of the data DAT. For example, when it becomes a time or a time zone in which the data DAT needs to be collected, the control device 5 determines that fetching of the data DAT should be started. When the fetching of the data DAT is started (step S1: Yes), the control device 5 proceeds to processing in step S2. Otherwise (step S1: No), the control device 5 repeats the processing in step S1.

In step S2, the control device 5 determines whether a memory residual amount is equal to or larger than a predetermined amount. When the memory residual amount is equal to or larger than the predetermined amount (step S2: Yes), the control device 5 proceeds to processing in step S4. When the memory residual amount is less than the predetermined amount (step S2: No), the control device 5 proceeds to processing in step S3.

In step S3, the control device 5 controls the operation A to the operation C in the fourth control mode. The control in the fourth control mode is performed, for example, as described above with reference to FIG. 9.

In step S4, the control device 5 determines whether the battery residual amount is equal to or larger than a first level. When the battery residual amount is equal to or larger than the first level (step S4: Yes), the control device 5 proceeds to processing in step S5. When the battery residual amount is less than the first level (step S4: No), the control device 5 proceeds to processing in step S6.

In step S5, the control device 5 controls the operation A to the operation C in the first control mode. The control in the first control mode is performed, for example, as described above with reference to FIG. 2.

In step S6, it is determined whether the battery residual amount is equal to or larger than a second level. When the battery residual amount is equal to or larger than the second level (step S6: Yes), the control device 5 proceeds to processing in step S7. When the battery residual amount is less than the second level (step S6: No), the control device 5 proceeds to processing in step S8.

In step S7, the control device 5 controls the operation A to the operation C in the second control mode. The control in the second control mode is performed, for example, as described above with reference to FIG. 4.

In step S8, the control device 5 determines whether the battery residual amount is equal to or larger than a third level. When the battery residual amount is equal to or larger than the third level (step S8: Yes), the control device 5 proceeds to processing in step S9. When the battery residual amount is less than the third level (step S8: No), the control device 5 proceeds to processing in step S10.

In step S9, the control device 5 controls the operation A to the operation C in the third control mode. The control in the third control mode is performed, for example, as described above with reference to FIGS. 5 to 8.

In step S10, the control device 5 controls the operation A to the operation C in the fifth control mode. The control in the fourth control mode is, for example, as described above with reference to FIG. 10.

After completion of the processing in step S3, step S5, step S7, step S9, or step S10, the control device 5 proceeds to processing in step S11.

In step S11, the control device 5 determines whether to finish the fetching of the data DAT. For example, when a time or a time zone in which the collection of the data DAT is unnecessary comes, the control device 5 determines that the fetching of the data DAT should be ended. When ending the fetching of the data DAT (step S11: Yes), the control device 5 proceeds to processing in step S12. Otherwise (step S11: No), the control device 5 returns to the processing in step S2.

In step S12, the control device 5 determines whether to end a system operation. For example, when an instruction or the like for ending the operation of the system 100 is given by a user operation (for example, an operation by an administrator or the like of the system 100), the control device 5 determines that the system operation should be ended. When ending the system operation (step S12: Yes), the control device 5 ends the processing of the flowchart. Otherwise (step S12: No), the control device 5 returns to the processing in step S1.

For example, as described above, control in an appropriate control mode depending on the battery residual amount (or the additional power amount), the memory residual amount, or the like is performed. As described above, the loss of the data DAT can be suppressed.

2. Example of Hardware Configuration

Figure 13:
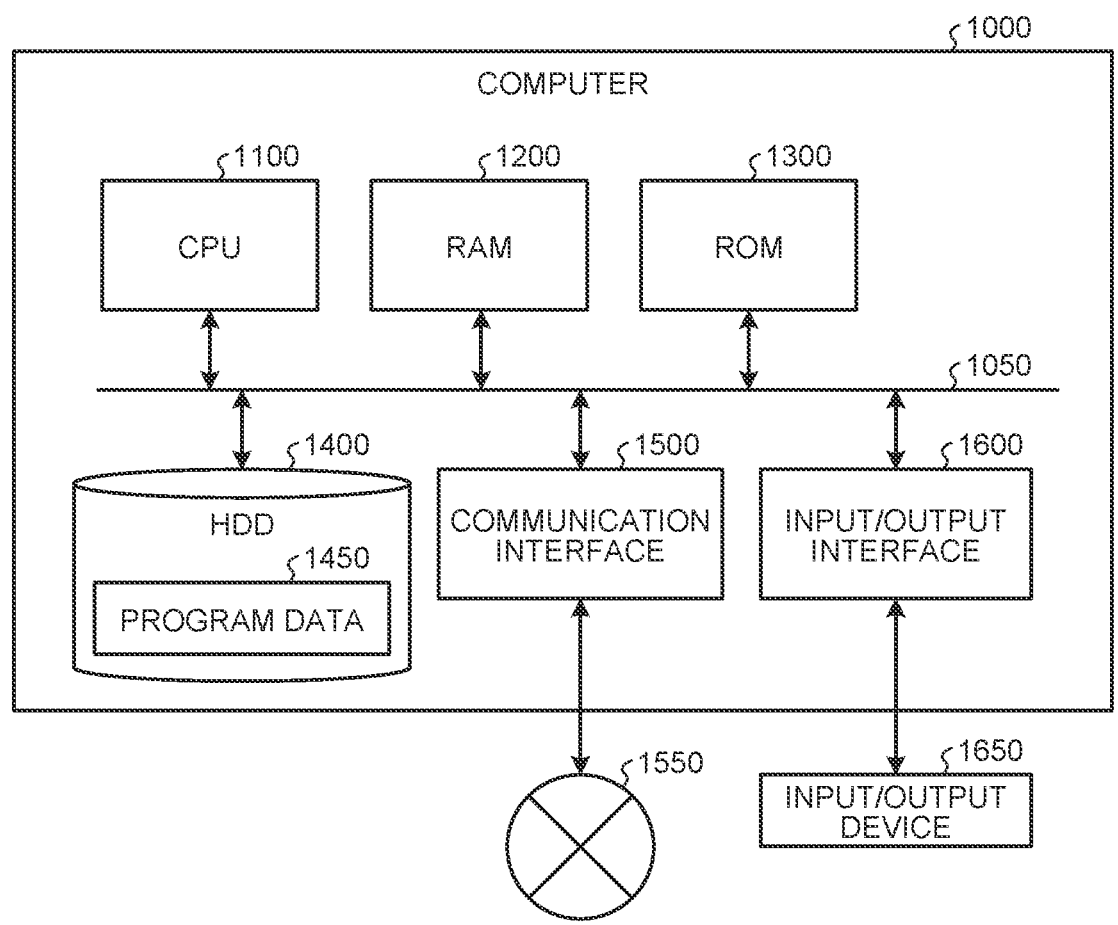
FIG. 13 is a diagram illustrating an example of a hardware configuration of the control device.

FIG. 13 is a diagram illustrating an example of a hardware configuration of the control device. In this example, the control device 5 is implemented by a computer 1000. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected to each other by a bus 1050.

The CPU 1100 operates based on a program stored in the ROM 1300 or the HDD 1400, and controls each unit. For example, the CPU 1100 loads the program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is started, a program dependent on the hardware of the computer 1000, and the like.

The HDD 1400 is a computer-readable recording medium that non-transiently records a program executed by the CPU 1100, data used by the program, and the like. Specifically, the HDD 1400 is a recording medium that records a control program according to the present disclosure as an example of program data 1450.

The communication interface 1500 is an interface configured to allow the computer 1000 to be connected to an external network 1550 (for example, the Internet). For example, the CPU 1100 receives data from another device or transmits data generated by the CPU 1100 to another device via the communication interface 1500.

The input/output interface 1600 is an interface configured to connect an input/output device 1650 to the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface configured to read a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, when the computer 1000 functions as the control device 5, the CPU 1100 of the computer 1000 implements a function of the control device 5 by executing the control program loaded onto the RAM 1200. In addition, the HDD 1400 stores the control program according to the present disclosure. It is noted that the CPU 1100 reads the program data 1450 from the HDD 1400 and executes the program data, but as another example, these programs may be acquired from another device via the external network 1550.

The control device 5 is not limited to the hardware configuration as described above, and may be implemented by various hardware configurations. For example, the control device 5 may be implemented by a dedicated device or the like customized to implement the function of the control device 5.

3. Example of Effects

The control device 5 described above is specified, for example, as follows. As described with reference to FIGS. 1 to 3, the control device 5 controls a plurality of operations that consumes the environmentally generated power (power generated by the energy harvester 8) in at least one control mode of the plurality of control modes. The plurality of operations includes the operation A, the operation B, and the operation C. The operation A includes writing (to the storage device 2) of the data DAT from the sensor 1. The operation B includes recognition (by the recognition device 3) of the data DAT written by the operation A. The operation C includes transmission (by the transmission device 4) of the data DAT (data DATrecog) after recognition by the operation B. The plurality of control modes includes the first control mode and the second control mode. In the first control mode, the plurality of operations is controlled so that at least one of the operation B and the operation C for the previously processed data DAT from the sensor 1 is performed in preference to the operation A for the data DAT from the sensor 1. In the second control mode, the plurality of operations is controlled so that the operation A for the data DAT from the sensor 1 is performed in preference to the operation B and the operation C for the previously processed DAT from the sensor 1.

In the control device 5, the operation A for the data D is performed in preference to the operation B or the operation C for the previously processed data DAT by the second control mode. As a result, the loss of the data DAT can be suppressed.

In the case of the second control mode, in the operation B and the operation C for the previously processed data DAT from the sensor 1, the control device 5 may control a plurality of operations so as to preferentially perform the operation C. As a result, the transmission of the data DAT can be preferentially completed.

The control device 5 may control a plurality of operations in the first control mode when the residual capacity (battery residual amount) of the storage battery 7 charged with the environmentally generated power is equal to or larger than the first level, and may control a plurality of operations in the second control mode when the residual capacity of the storage battery 7 is less than the first level. The first level may be a power amount consumed when the three operations including the operation A to the operation C are simultaneously performed. For example, in this manner, it is possible not only to control a plurality of operations in an appropriate control mode depending on the battery residual amount but also to suppress the loss of the new data DAT.

As described with reference to FIGS. 5 to 8 and the like, the plurality of control modes may include the third control mode of controlling the plurality of operations so that the operation B is performed collectively for the plurality of data DAT from the sensor 1. The control device 5 may control the plurality of operations in the third control mode when the residual capacity (the battery residual amount) of the storage battery 7 charged with the environmentally generated power is less than the second level. The second level may be a power amount consumed when, among the operations A to C, two of the operations including the operation A are simultaneously performed. By the third control mode, the power consumption can be suppressed as compared with a case in which the operation B is performed on each of the plurality of data DAT. Even when the battery residual amount may be further insufficient, it is possible to suppress the loss of the new data DAT.

As described with reference to FIG. 9 and the like, the plurality of control modes may include the fourth control mode of controlling the plurality of operations so that the operation C for the previously processed data DAT from the sensor 1 is performed in preference to the operation A for the new data DAT from the sensor 1, and the control device 5 may control the plurality of operations in the fourth control mode in a case where the memory residual amount for writing the data DAT is less than the predetermined amount. By the fourth control mode, it is possible to suppress the loss of the new data DAT due to the insufficient memory residual amount.

As described with reference to FIG. 10 and the like, the plurality of control modes may include the fifth control mode of controlling the plurality of operations so that neither the operation A for new data from the sensor 1 nor the operation B and the operation C for the previously processed data DAT from the sensor 1 are performed, the control device 5 may control the operation in the fifth control mode when the battery residual amount of the storage battery 7 is less than the third level, and the third level may be the power amount consumed when the operation A is performed. According to the fifth control mode, for example, although a loss of the new data DAT occurs once, the battery residual amount can be recovered by the loss, and the loss of the new data DAT after the recovery can be suppressed (minimized).

The control method described with reference to FIG. 12 and the like is also one of the embodiments. In the control method, a plurality of operations that consumes the environmentally generated power is controlled in at least one control mode of the plurality of control modes. The plurality of control modes and the plurality of operations is performed as described above. In such a control method as well, it is possible to suppress the loss of the new data DAT.

The control program (for example, the program data 1450) described with reference to FIG. 13 and the like is also one of the embodiments. The control program causes a computer (for example, the computer 1000) to control a plurality of operations that consumes the environmentally generated power in at least one control mode of the plurality of control modes. The plurality of control modes and the plurality of operations is performed as described above. In such a control program as well, it is possible to suppress the loss of the new data DAT.

It is noted that the effects described in the present disclosure are merely examples and are not limited to the disclosed contents. Other effects may be obtained.

Although embodiments of the present disclosure have been described above, the technical scope of the present disclosure is not limited to the above-described embodiments as it is, and various modifications can be made without departing from the gist of the present disclosure. In addition, components of different embodiments may be appropriately combined.

It is noted that the present technology can also have the following configurations.

(1) A control device configured to control a plurality of operations that consumes environmentally generated power in at least one control mode of a plurality of control modes,
wherein the plurality of operations includes:
an operation A including writing of data from a sensor;
an operation B including recognition of the data written by the operation A; and
an operation C including transmission of the data after the recognition by the operation B, and
wherein the plurality of control modes includes:
a first control mode of controlling the plurality of operations so as to perform, in preference to the operation A for the data from the sensor, at least one of the operation B and the operation C for the previously processed data from the sensor; and
a second control mode of controlling the plurality of operations so as to perform the operation A for the data from the sensor in preference to the operation B and the operation C for the previously processed data from the sensor.

(2) The control device according to (1),
wherein, in the second control mode, the plurality of operations is controlled so as to preferentially perform the operation C between the operation B and the operation C for the previously processed data from the sensor.

(3) The control device according to (1) or (2),
wherein the plurality of operations is controlled in the first control mode when a residual capacity of a storage battery charged with the environmentally generated power is equal to or larger than a first level, and
wherein the plurality of operations is controlled in the second control mode when the residual capacity of the storage battery is less than the first level.

(4) The control device according to (3),
wherein the first level is a power amount consumed when the operation A, the operation B, and the operation C are performed simultaneously.

(5) The control device according to any one of (1) to (4),
wherein the plurality of control modes includes a third control mode of controlling the plurality of operations so that the operation B is collectively performed on a plurality of pieces of the data from the sensor.

(6) The control device according to (5),
wherein the plurality of operations is controlled in the third control mode when a residual capacity of a storage battery charged with the environmentally generated power is less than a second level, and wherein the second level is a power amount consumed when, among the operations A to C, two of the operations including the operation A are simultaneously performed.

(7) The control device according to any one of (1) to (6),
wherein the plurality of control modes includes a fourth control mode of controlling the plurality of operations so as to perform, in preference to the operation A for the data from the sensor, the operation C for the previously processed data from the sensor, and
wherein the control device controls the plurality of operations in the fourth control mode when a memory residual amount for the writing of the data is less than a predetermined amount.

(8) The control device according to any one of (1) to (7),
wherein the plurality of control modes includes a fifth control mode of controlling the plurality of operations so that neither the operation A for the data from the sensor nor the operation B and the operation C for the previously processed data from the sensor are performed,
wherein the control device controls the operations in the fifth control mode when a battery residual amount of a storage battery charged with the environmentally generated power is less than a third level, and
wherein the third level is a power amount consumed when the operation A is performed.

(9) A control method of controlling a plurality of operations that consumes environmentally generated power in at least one control mode of a plurality of control modes,
wherein the plurality of operations includes:
an operation A including writing of data from a sensor;
an operation B including recognition of the data written by the operation A; and
an operation C including transmission of the data after the recognition by the operation B, and
wherein the plurality of control modes includes:
a first control mode of controlling the plurality of operations so as to perform, in preference to the operation A for the data from the sensor, at least one of the operation B and the operation C for the previously processed data from the sensor; and
a second control mode of controlling the plurality of operations so as to perform the operation A for the data from the sensor in preference to the operation B and the operation C for the previously processed data from the sensor.

(10) A control program configured to cause a computer to control a plurality of operations that consumes environmentally generated power in at least one control mode of a plurality of control modes,
wherein the plurality of operations includes:
an operation A including writing of data from a sensor;
an operation B including recognition of the data written by the operation A; and
an operation C including transmission of the data after the recognition by the operation B, and
wherein the plurality of control modes includes:
a first control mode of controlling the plurality of operations so as to perform, in preference to the operation A for the data from the sensor, at least one of the operation B and the operation C for the previously processed data from the sensor; and
a second control mode of controlling the plurality of operations so as to perform the operation A for the data from the sensor in preference to the operation B and the operation C for the previously processed data from the sensor.

REFERENCE SIGNS LIST

1 SENSOR
2 STORAGE DEVICE
3 RECOGNITION DEVICE
4 TRANSMISSION DEVICE
5 CONTROL DEVICE
6 STORAGE BATTERY MONITORING DEVICE
7 STORAGE BATTERY
8 ENERGY HARVESTER (ENVIRONMENTAL POWER GENERATION DEVICE)
100 SYSTEM (ENERGY HARVESTING SYSTEM, ENVIRONMENTAL POWER GENERATION SYSTEM)
1450 PROGRAM DATA (CONTROL PROGRAM)

The invention claimed is:

1. A control device, comprising:
circuitry configured to control a plurality of operations, wherein
   the plurality of operations consumes environmentally generated power in at least one control mode of a plurality of control modes,
   the plurality of operations includes:
      an operation A including a writing operation of data from a sensor;
      an operation B including recognition of the data written by the operation A; and
      an operation C including transmission of the data after the recognition by the operation B, and
   the plurality of control modes includes:
      a first control mode to control the plurality of operations so as to perform, in preference to the operation A for the data from the sensor, at least one of the operation B for previously processed data from the sensor or the operation C for the previously processed data from the sensor; and
      a second control mode to control the plurality of operations so as to perform the operation A for the data from the sensor, in preference to the operation B for the previously processed data from the sensor and the operation C for the previously processed data from the sensor.

2. The control device according to claim 1, wherein, in the second control mode, the plurality of operations is controlled so as to preferentially perform the operation C from among the operation B for the previously processed data from the sensor and the operation C for the previously processed data from the sensor.

3. The control device according to claim 1, wherein
the plurality of operations is controlled in the first control mode based on a residual capacity of a storage battery charged with the environmentally generated power that is equal to or larger than a first level, and
the plurality of operations is controlled in the second control mode based on the residual capacity of the storage battery that is less than the first level.

4. The control device according to claim 3, wherein the first level is a power amount consumed to simultaneously perform the operation A, the operation B, and the operation C.

5. The control device according to claim 1, wherein the plurality of control modes further includes a third control mode of to control the plurality of operations so that the operation B is collectively performed on a plurality of pieces of the data from the sensor.

6. The control device according to claim 5, wherein the plurality of operations is controlled in the third control mode based on a residual capacity of a storage battery charged with the environmentally generated power that is less than a second level, and
the second level is a power amount consumed to simultaneously perform two operations including the operation A, from among the operation A, the operation B, and the operation C.

7. The control device according to claim 1, wherein the plurality of control modes further includes a fourth control mode to control the plurality of operations so as to perform, in preference to the operation A for the data from the sensor, the operation C for the previously processed data from the sensor, and
the circuitry is further configured to control the plurality of operations in the fourth control mode based on a memory residual amount for the writing operation of the data that is less than a specific amount.

8. The control device according to claim 1, wherein the plurality of control modes further includes a fifth control mode to control the plurality of operations so that neither the operation A for the data from the sensor nor the operation B for the previously processed data from the sensor and the operation C for the previously processed data from the sensor are performed,
the circuitry is further configured to control the plurality of operations in the fifth control mode based on a battery residual amount of a storage battery charged with the environmentally generated power that is less than a third level, and
the third level is a power amount consumed to perform the operation A.

9. A control method, comprising:
controlling a plurality of operations, wherein
   the plurality of operations consumes environmentally generated power in at least one control mode of a plurality of control modes,
   the plurality of operations includes:
      an operation A including writing of data from a sensor;
      an operation B including recognition of the data written by the operation A; and
      an operation C including transmission of the data after the recognition by the operation B, and
   the plurality of control modes includes:
      a first control mode of controlling the plurality of operations so as to perform, in preference to the operation A for the data from the sensor, at least one of the operation B for previously processed data from the sensor or the operation C for the previously processed data from the sensor; and
      a second control mode of controlling the plurality of operations so as to perform the operation A for the data from the sensor, in preference to the operation B for the previously processed data from the sensor and the operation C for the previously processed data from the sensor.

10. A non-transitory computer-readable storage medium having stored thereon, computer-executable instructions which, when executed by a computer, cause the computer to execute operations, the operations comprising:

controlling a plurality of operations, wherein
the plurality of operations consumes environmentally generated power in at least one control mode of a plurality of control modes,
the plurality of operations includes:
an operation A including writing of data from a sensor;
an operation B including recognition of the data written by the operation A; and
an operation C including transmission of the data after the recognition by the operation B, and
the plurality of control modes includes:
a first control mode of controlling the plurality of operations so as to perform, in preference to the operation A for the data from the sensor, at least one of the operation B for previously processed data from the sensor or the operation C for the previously processed data from the sensor; and
a second control mode of controlling the plurality of operations so as to perform the operation A for the data from the sensor, in preference to the operation B for the previously processed data from the sensor and the operation C for the previously processed data from the sensor.

* * * * *